(12) United States Patent
Sutehall et al.

(10) Patent No.: US 10,983,295 B2
(45) Date of Patent: Apr. 20, 2021

(54) OPTICAL CABLE FOR TERRESTRIAL NETWORKS

(71) Applicant: Prysmian S.p.A., Milan (IT)

(72) Inventors: Ralph Sutehall, Milan (IT); Martin Vincent Davies, Milan (IT); Ian Dewi Lang, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 16/628,372

(22) PCT Filed: Jul. 11, 2017

(86) PCT No.: PCT/EP2017/067370
§ 371 (c)(1),
(2) Date: Jan. 3, 2020

(87) PCT Pub. No.: WO2019/011413
PCT Pub. Date: Jan. 17, 2019

(65) Prior Publication Data
US 2020/0183112 A1 Jun. 11, 2020

(51) Int. Cl.
*G02B 6/44* (2006.01)
(52) U.S. Cl.
CPC .......... *G02B 6/443* (2013.01); *G02B 6/4433* (2013.01); *G02B 6/4434* (2013.01);
(Continued)
(58) Field of Classification Search
CPC ........ G02B 6/44; G02B 6/4427; G02B 6/443; G02B 6/4433; G02B 6/4434;
(Continued)

(56) References Cited

U.S. PATENT DOCUMENTS

2013/0216192 A1* 8/2013 Gimblet .............. B29C 48/3366
385/100
2014/0029902 A1 1/2014 Gimblet et al.
(Continued)

FOREIGN PATENT DOCUMENTS

WO WO 2012/071490 A2 5/2012
WO WO 2015/014386 A1 2/2015

OTHER PUBLICATIONS

International Search Report form the European Patent Office in corresponding International Application No. PCT/EP2017/067370, dated Apr. 3, 2018.
(Continued)

*Primary Examiner* — Michael P Mooney
(74) *Attorney, Agent, or Firm* — Finnegan, Henderson, Farabow, Garrett & Dunner, L.L.P.

(57) ABSTRACT

An optical cable comprising an optical core and an external sheath surrounding the optical core, wherein the external sheath comprises an inner layer circumferentially enclosing the optical core and an outer layer circumferentially enclosing the inner layer and comprising at least one longitudinal cavity accessible from outside the external sheath and extending through at least a portion of the outer layer thickness. The inner and outer layers of the external sheath are made of a first material having a first tensile strength, while the cavities in the outer layer are filled with a second material having a second tensile strength lower than the first tensile strength.

15 Claims, 2 Drawing Sheets

(52) U.S. Cl.
CPC ......... *G02B 6/4494* (2013.01); *G02B 6/4495* (2013.01); *G02B 6/4403* (2013.01)

(58) Field of Classification Search
CPC .. G02B 6/4475; G02B 6/4494; G02B 6/4495; B29D 11/00663
USPC .......................................... 385/100–114, 128
See application file for complete search history.

(56) References Cited

U.S. PATENT DOCUMENTS

2015/0049993 A1    2/2015  Gimblet et al.
2016/0202435 A1*   7/2016  Lang .................... G02B 6/4495
                                                385/113

OTHER PUBLICATIONS

Written Opinion of the International Searching Authority from the European Patent Office in corresponding International Application No. PCT/EP2017/067370, dated Apr. 3, 2018.
"Plastics—Determination of tensile properties", International Organization for Standardization, ISO 527-1, Second edition, Feb. 15, 2012.

\* cited by examiner

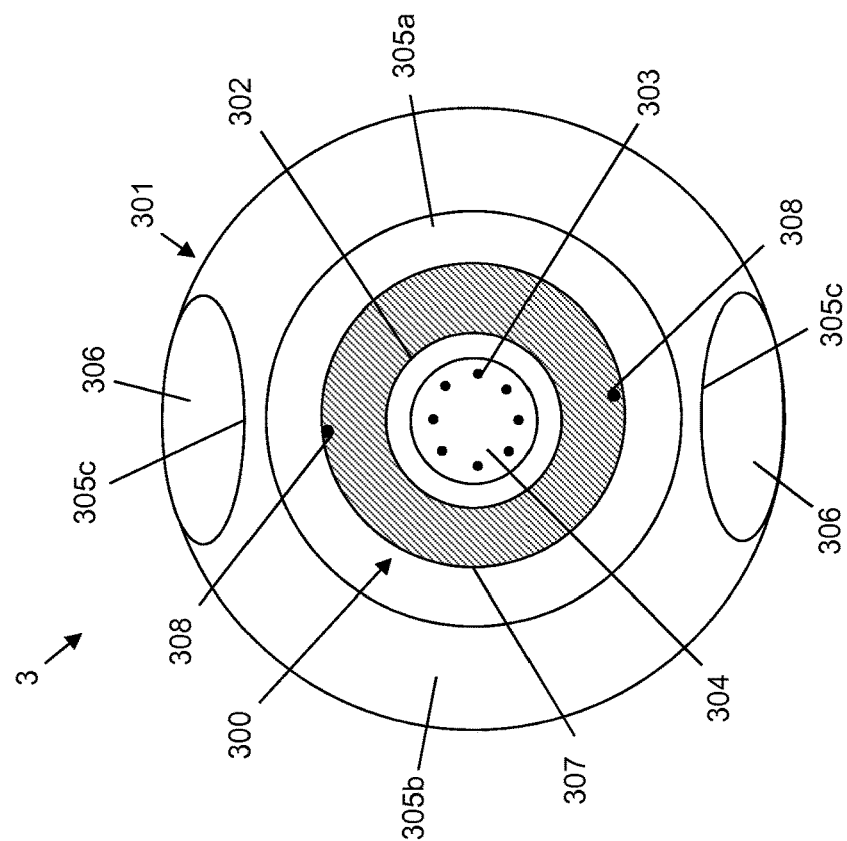
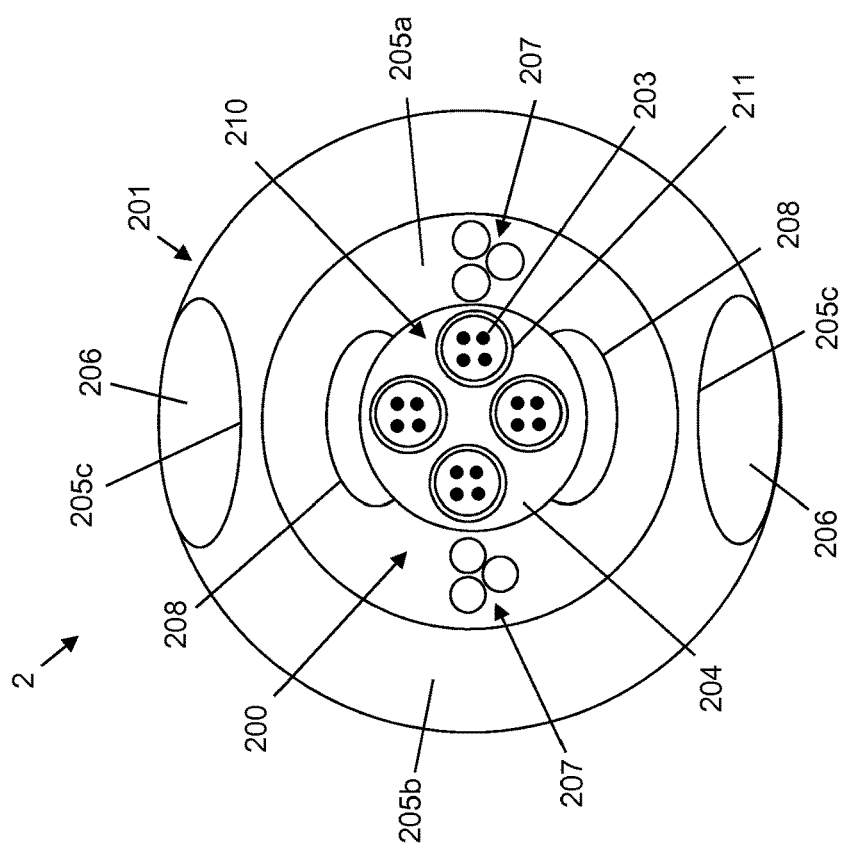

OPTICAL CABLE FOR TERRESTRIAL NETWORKS

This application is a national phase application based on PCT/EP2017/067370, filed Jul. 11, 2017, the content of which is incorporated herein by reference.

TECHNICAL FIELD

The present invention relates to the field of optical cables. More particularly, the present invention relates to an optical cable for terrestrial networks, in particular—but not exclusively—optical access networks such as FTTH (Fiber To The Home) networks and FTTP (Fiber To The Premises) networks.

BACKGROUND ART

As known, an optical cable typically comprises an optical core including one or more optical fibers and an external sheath enclosing the optical core. The external sheath is typically made of a polymeric material and has the primary function of protecting the optical core from the mechanical point of view.

Within the external sheath, the optical fibers may be arranged in various ways. In particular, in the so-called "loose tube cables", the optical fibers are loosely arranged within one or more buffer tubes. Each buffer tube typically contains multiple fibers, and the individual fibers are free to move relative to one another within the buffer tube. In the so-called "central loose tube cables" (briefly, CLT cables), all the optical fibers of the cable are loosely arranged within a single buffer tube, which is in turn enclosed by the external sheath. In the so-called "multi loose tube cables" (briefly, MLT cables), the optical fibers are instead divided into multiple units (e.g. 3, 4 or 6 units), the optical fibers of each unit being loosely arranged within a respective buffer tube. The buffer tubes are then stranded according to an open helix or S-Z arrangement, typically about a central strength member. A binder may also be provided around the buffer tubes for retaining them. Both in CLT cables and in MTL cables, the external sheath may comprise two side strength members (typically made of steel or fiber reinforced resin) embedded within the sheath's thickness and placed at diametrically opposed positions.

Loose tube cables are typically used for applications where the optical fibers must be individually extracted from the cable and spliced, e.g. in FTTH and FTTP applications. For instance, drop cables of FTTH or FTTP networks are typically implemented as CLT or MLT cables with a particularly reduced diameter (less than 10 mm).

When optical cables are intended for aerial installation or buried underground installation, their external sheath shall be designed to provide high abrasion resistance (e.g. due to rubbing against tree branches, in case of aerial installation in the proximity of trees) and high crush resistance. To this purpose, the cables are typically provided with high thickness sheaths, namely sheaths whose thickness typically ranges from about 1.0 mm to about 2.0 mm. Besides, high hardness materials are typically used for the cable sheath, such as HDPE (High-Density Polyethylene).

WO 2015/014386 in the name of the same Applicant discloses a cable with an optical core and an external sheath which comprises sections made of two materials with different fracture toughness values, e.g. HDPE and LDPE. The section(s) made of the material with the lowest fracture toughness value (e.g. LDPE) are accessible from outside the cable and extend substantially through the whole sheath's thickness.

SUMMARY OF THE INVENTION

The inventors have noticed that the above known cables exhibit some drawbacks.

As to known cables with high thickness, high hardness external sheaths, it is disadvantageously difficult to cut their external sheaths in order to access the optical fibers within the optical core enclosed therein. At this purpose, special cutting tools with rotating blades may be used, instead of fixed blades tools. Use of these rotating blade tools is however difficult, because of the high longitudinal and transversal force that shall be applied by the operator on the tool, in order to make the blades penetrate through the whole thickness of the external sheath and, at the same time, longitudinally run along the cable to perform cuts with a suitable length.

As to the cable of WO 2015/014386, its external sheath may be easily removed, since blades are needed only to perform initial, short longitudinal cuts in the lowest fracture toughness sections of the cable's external sheath. Then, the cut edges of the lowest fracture toughness material are pulled apart by hand. The pulling force causes the lowest fracture toughness material to fracture, thereby propagating the initial short cut longitudinally along the sheath through its whole thickness.

While it may be cut more easily, the inventors have noticed that—when it is used for aerial installation—the cable of WO 2015/014386 may be prone to failure due to Aeolian vibrations. Aeolian vibrations may indeed cause the cable to repeatedly flex or bend, and such repeated flexing or bending may disadvantageously cause the external sheath to break at the boundaries between sections of different materials.

In view of the above, the Applicant has tackled the problem of providing an optical cable for terrestrial networks (in particular, but not exclusively, FTTH or FTTP networks) whose sheath may be removed more easily than known cables exhibiting comparable abrasion resistance and crush resistance and which—in case of aerial installation—is resistant against detrimental effects of Aeolian vibrations.

The Applicant found that the above problems are solved by an optical cable comprising an optical core and an external sheath surrounding the optical core, wherein the external sheath comprises an inner layer circumferentially enclosing the optical core and an outer layer circumferentially enclosing the inner layer and comprising at least one longitudinal cavity accessible from outside the external sheath and extending through at least a portion of the outer layer thickness. The inner and outer layers of the external sheath are made of a first material having a first tensile strength, while the cavities in the outer layer are filled with a second material having a second tensile strength lower than the first tensile strength.

As known, the tensile strength of a material is the capacity of a material to withstand loads tending to elongate and is measured as the maximum stress that a material can withstand while being stretched or pulled before breaking. Tensile strength is measured as force per unit area, namely Pa (or MPa) in the International System of Units SI. The values of tensile strength mentioned herein below are obtained by applying the standard test method defined by ISO 527-1: 2012.

The cable of the present invention is advantageously easier to cut, in comparison to known cables exhibiting comparable abrasion resistance and crush resistance. The first material of which the inner and outer layer of the cable's external sheath are made and the second material filling the outer layer's cavities may be indeed chosen so that their hardness values are high enough to ensure adequate abrasion resistance and crush resistance (e.g. HDPE and LDPE, respectively). At the same time, the lower tensile strength of the second material filling the cavities advantageously eases the cutting operation. Indeed, the cable external sheath may be cut by performing longitudinal cuts along the cavities of the sheath's outer layer by a tool having rotating blades. The lower tensile strength of the material filling the cavities allows the blades to penetrate more easily at least through the outer layer of the external sheath, so that the external sheath may be cut through its whole thickness by applying a reduced transversal force on the tool. Also the longitudinal force to be applied in order to make the tool longitudinally run along the cable and obtain a cut of the desired length is advantageously reduced.

Besides, in case or aerial installation, the cable of the invention advantageously is more resistant against detrimental effects of Aeolian vibrations. Indeed, the inner layer of the external sheath prevents the boundaries between first material and second material from entering into contact with the optical core of the cable. Such arrangement of the first and second materials in the external sheath advantageously reduces the probability that, in case of a repeated flexing or bending of the cable due to Aeolian vibrations, the external sheath breaks at the boundaries between first and second materials. Moreover, even in case of break, the inner layer—which is made of the first material only—remains intact and continues protecting the optical core, thereby preventing the cable from failing.

According to a first aspect, the present invention provides an optical cable comprising an optical core and an external sheath surrounding the optical core, wherein the external sheath comprises:
- an inner layer circumferentially enclosing the optical core; and
- an outer layer circumferentially enclosing the inner layer and comprising at least one cavity accessible from outside the external sheath and extending through at least a portion of the thickness of the outer layer, wherein the inner layer and the outer layer are made of a first material having a first tensile strength and the at least one cavity of the outer layer is filled with a second material having a second tensile strength lower than the first tensile strength.

Preferably, the at least one cavity has an oval cross-section.

Preferably, the outer layer comprises two cavities arranged at diametrically opposed positions with respect to the optical core.

Preferably, the at least one cavity has a depth between 30% to 60% of an overall thickness of the external sheath.

Preferably, the at least one cavity is accessible from outside the external sheath along an arc of a curved line delimiting a cross section of the at least one cavity, the arc having an angular width α comprised between 20 and 60 degrees.

Preferably, the first material has a tensile strength comprised between 10 and 25 MPa and the second material has a tensile strength comprised between 25 and 35 MPa.

Preferably, the first material has a first flexural modulus and the second material has a second flexural modulus lower than the first flexural modulus.

Preferably, the first flexural modulus is comprised between 600 and 1200 MPa and the second flexural modulus is comprised between 200 and 600 MPa.

Preferably, the first material has a first hardness and the second material has a second hardness lower than the first hardness.

Preferably, the first hardness is comprised between 55 and 70 Shore D and the second hardness is comprised between 40 and 60 Shore D.

Preferably, the first material and the second material comprise a same compound.

Preferably, the at least one cavity of the outer layer is filled with the second material blended with the first material.

Preferably, the first material is high-density polyethylene.

Preferably, the second material is low-density polyethylene.

According to a second aspect, the present invention provides a process for manufacturing an optical cable, the process comprising:
- providing an optical core; and
- extruding an external sheath surrounding the optical core, the external sheath comprising:
  - an inner layer circumferentially enclosing the optical core; and
  - an outer layer circumferentially enclosing the inner layer and comprising at least one cavity accessible from outside the external sheath and extending through a portion of the thickness of the outer layer, wherein the inner layer and the outer layer are made of a first material having a first tensile strength and the at least one cavity of the outer layer is filled with a second material having a second tensile strength lower than the first tensile strength.

BRIEF DESCRIPTION OF THE DRAWINGS

The present invention will become fully clear by reading the following detailed description, to be read by referring to the accompanying drawings, wherein:

FIG. 2 is a cross-section view of an optical cable according to a second embodiment of the present invention; and FIG. 3 is a cross-section view of an optical cable according to a third embodiment of the present invention.

DETAILED DESCRIPTION OF PREFERRED EMBODIMENTS OF THE INVENTION

Figure 1:
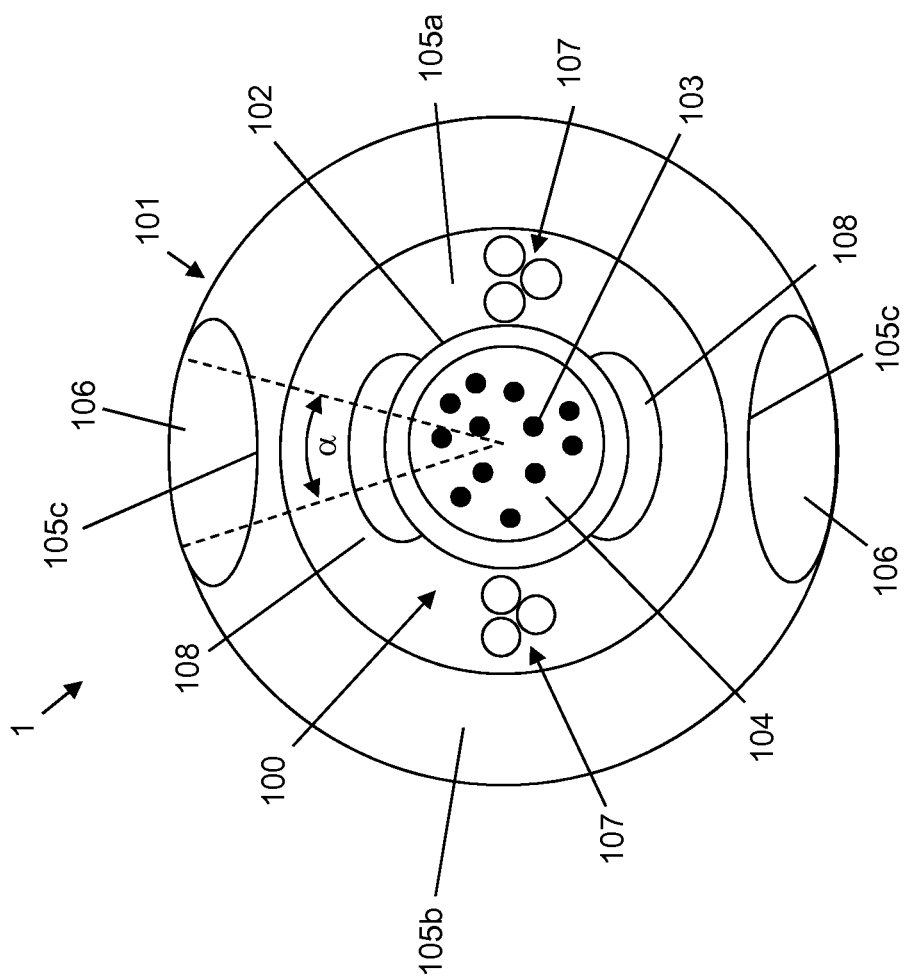
FIG. 1 is a cross-section view of an optical cable according to a first embodiment of the present invention.

FIGS. 1 to 3 are not in scale.

FIG. 1 shows an optical cable 1 according to a first embodiment of the present invention. The optical cable 1 according to the first embodiment of the present invention is a drop cable for FTTH or FTTP applications.

The optical cable 1 comprises an optical core 100 and a sheath 101 surrounding the optical core 100.

The optical core 100 comprises a buffer tube 102 and a number of optical fibers 103 loosely arranged within the buffer tube 102. The buffer tube 102 preferably has an outer diameter lower than 4 mm, more preferably lower than 2.5 mm. The buffer tube 102 is preferably made of a thermoplastic polymeric material, for instance PBT (polybutylene terephthalate). The number of optical fibers 103 preferably ranges from one to twelve. By way of non limiting example, the cable shown in FIG. 1 comprises twelve optical fibers 103. The optical fibers 103 are preferably single mode fibers compliant with ITU-T G652 standard. The interstices between the optical fibers 103 within the buffer tube 102 are preferably filled with a water-blocking material 104, e.g. a thixotropic gel.

The outer diameter of the sheath 101 is preferably lower than 10 mm, more preferably lower than 8 mm, even more preferably substantially equal to 6 mm.

The sheath 101 preferably comprises an inner layer 105a circumferentially enclosing the optical core 100 and an outer layer 105b circumferentially enclosing the inner layer 105a.

The outer layer 105b comprises at least one longitudinal cavity 105c accessible from outside the sheath 101. Preferably, as shown in FIG. 1, the outer layer 105b comprises two longitudinal cavities 105c arranged at diametrically opposite positions.

Each cavity 105c preferably extends (in the radial direction) through a portion of the thickness of the outer layer 105b, as shown in FIG. 1. Alternatively, each cavity 105c may extend through the whole thickness of the outer layer 105b (variant not shown in the drawings).

Preferably, the depth of each cavity 105c is 30% to 60% of the overall thickness of the external sheath 101 (namely, the sum of the thickness of inner layer 105a and the thickness of outer layer 105b, as measured as if it had no cavities). More preferably, the depth of each cavity 105c is comprised between 35% and 45% the overall thickness of the external sheath 101, even more preferably is about 40% the overall thickness of the external sheath 101. The Applicant has indeed noticed that, while the mechanical stability of the sheath 101 (also against Aeolian vibrations) increases as the depth of the cavities 105c decreases, conversely the easiness of the sheath cutting operation increases as the depth of the cavities 105c increases. This trade-off is advantageously solved by providing cavities 105c with depth in the above ranges.

Each cavity 105c preferably has a cross section with an oval shape, namely a convex shape delimited by a curved line and having at least one axis of symmetry. For instance, each cavity 105c may have an elliptical or substantially elliptical cross section. The oval shape advantageously eases the cable manufacturing process and allows maintain the circular cross section of the cable 1.

Each cavity 105c is accessible from outside the sheath 101 along an arc of the curved line delimiting the cross section of the cavity 105c, said arc having an angular width α. The angular width α is preferably comprised between 20 and 60 degrees. More preferably, the angular width α is comprised between 25 and 35 degrees, even more preferably is substantially equal to 30 degrees.

The inner layer 105a and the outer layer 105b of the sheath 105 are made of a first material (preferably, they form a unique layer made of the first material), while the cavities 105c are filled with a second material, which accordingly forms two longitudinally extending sheath portions 106.

Preferably, the first material has a tensile strength higher than the tensile strength of the second material. Preferably, the tensile strength of the first material is comprised between 10 and 25 MPa, more preferably between 15 and 20 MPa, for instance 18 MPa. Preferably, the tensile strength of the second material is comprised between 25 and 35 MPa, more preferably between 30 and 35 MPa, for instance 33 MPa.

Preferably, the first material has a flexural modulus higher than the flexural modulus of the second material. As known, the flexural modulus is a measure of the tendency of a material to bend. The flexural modulus of a material is determined from a stress-strain curve as produced by conducting flexural test according to ASTM D790-10. Flexural modulus is measured as force per unit area, namely Pa (or MPa) in the International System of Units SI. Preferably, the flexural modulus of the first material is comprised between 600 and 1200 MPa, more preferably between 900 and 1100 MPa, for instance 1000 MPa. Preferably, the flexural modulus of the second material is comprised between 200 and 600 MPa, more preferably between 300 and 500 MPa, for instance 400 MPa.

Preferably, the first material has a hardness higher than the hardness of the second material. As known, hardness is a measure of how resistant a material is to various kinds of permanent shape change when a compressive force is applied thereto. Hardness is measured by durometer Type D as defined by ISO 868:2003. Preferably, the hardness of the first material is comprised between 55 and 70 Shore D, more preferably between 55 and 65 Shore D, for instance 60 Shore D. Preferably, the hardness of the second material is comprised between 40 and 60 Shore D, more preferably between 50 and 55 Shore D, for instance 53 Shore D.

Preferably, the first material has a fracture toughness as defined by ISO 13586:2000 higher than the fracture toughness of the second material. As known, the fracture toughness is an indication of the amount of stress required to propagate a pre-existing flaw (e.g. a crack) in the material. A parameter called "stress-intensity factor" (K) is used to determine the fracture toughness. A Roman numeral subscript usually indicates the mode of fracture (three modes different modes of fracture exist). In particular, mode I fracture is the condition in which the crack plane is normal to the direction of largest tensile loading, and the mode I fracture toughness is determined by the stress-intensity factor KI (expressed in $MPa\sqrt{m}$).

Preferably, the value of KI of the first material is higher than the value of KI of the second material. Preferably, the value of KI of the first material is comprised between 0.9 and 6.0 $MPa\sqrt{m}$, more preferably between 1.0 and 3.0 $MPa\sqrt{m}$, for instance 2.0 $MPa\sqrt{m}$. Preferably, the value of KI of the second material is comprised between 0.3 and 1.5 $MPa\sqrt{m}$, more preferably between 0.4 and 0.7 $MPa\sqrt{m}$, for instance 0.5 $MPa\sqrt{m}$.

The first and second materials are preferably compatible from the mechanical point of view, in particular they exhibit properties of reciprocal adhesion. In particular, the first and second materials are preferably different mixtures comprising a same compound, e.g. polyethylene. This provides a strong and continuous bond between first and second material along the walls of the cavities 501c, thereby providing the sheath 101 with mechanical stability and improving its mechanical protection performance.

In order to further improve the adhesion of the longitudinally extending sheath portions 106 to the walls of the respective cavities 105c, the cavities 105c are preferably filled with a blend of the first material and the second material. Preferably, the mutual cross-blending between first material and second material is comprised between 5% and 30%, more preferably between 10% and 20%, for example 15%.

Optionally, the first and second materials may have different colors, in order to allow visual identification of the longitudinally extending sheath portions 106 from outside the cable 1. Optionally, at least one of the first material and the second material may be a transparent or translucent material, which allows the inner structure of the cable 1 to be partially visible from outside the cable 1.

The Applicant made positive tests using, as first material, HDPE (high-density polyethylene) and, as second material, LDPE (low-density polyethylene). More particularly, a positive test has been made using, as first material, HDPE Borealis 6062 and, as second material, LDPE Borealis 8706.

Optionally, the first material may comprise HDPE or LDPE mixed with PP (polypropylene).

Optionally, colorants may also be added to the first material and second material so as to allow easy identification of the longitudinally extending sheath portions 106 where the sheath 101 may be more easily cut. In case a material is pre-coloured (such as HDPE Borealis 6062, no colourant is needed.

Exemplary combinations of materials as provided in the tables herein below:

Example I

|                 | %   | description           | Base |
|-----------------|-----|-----------------------|------|
| first material  | 100 | Borealis 6062 (Black) | HDPE |
| second material | 98  | Borealis 8706 (Natural) | LDPE |
|                 | 2   | Yellow PE colourant   | PE   |

Example II (Cross-Blending)

|                 | %  | description             | Base |
|-----------------|----|-------------------------|------|
| first material  | 15 | Borealis 8706 (Natural) | LDPE |
|                 | 82 | Borealis 6063 (Natural) | HDPE |
|                 | 3  | Black PE colourant      | PE   |
| second material | 83 | Borealis 8706 (Natural) | LDPE |
|                 | 15 | Borealis 6063 (Natural) | HDPE |
|                 | 2  | Yellow PE colourant     | PE   |

Example III

|                 | %  | description             | Base |
|-----------------|----|-------------------------|------|
| first material  | 20 | Borealis 6063 (Natural) | HDPE |
|                 | 77 | Repsol PB140G2M (Natural) | PP |
|                 | 3  | Black PE colourant      | PE   |
| second material | 98 | Borealis 8706 (Natural) | LDPE |
|                 | 2  | Yellow PE colourant     | PE   |

Example IV

|                 | %  | description              | Base |
|-----------------|----|--------------------------|------|
| first material  | 39 | INEOS BP28D780 (Natural) | LDPE |
|                 | 58 | Repsol PB140G2M (Natural) | PP  |
|                 | 3  | Black PE colourant       | PE   |
| second material | 97 | INEOS BP28D780 (Natural) | LDPE |
|                 | 3  | Yellow PE colourant      | PE   |

The sheath 101 is preferably extruded by a dual extrusion equipment comprising two extrusion screws (one for each material of the sheath) feeding into a single cross head from different inlet points. A cartridge is fitted into the cross head, which splits the flow of first material provided by one of the two extrusion screws, so as to form a circumferentially closed tube of first material (namely, the inner layer 105*a* and outer layer 105*b*, which therefore constitute a unique layer) that surrounds the optical core 100. The second material provided by the other extrusion screw is instead fed to a plate arranged in front of the cross head, which is configured to divide the flow of second material into two half-flows and increase their pressure so as to allow them to penetrate through the thickness of the first material, thereby forming the longitudinally extending sheath portions 106 of the sheath 101.

The depth of the second material penetration during the extrusion process is dependent upon tooling and processing condition, which may exhibit differential extrusion pressures, the pressure of the second material being preferably greater than that the pressure of the first material. For instance, the ratio between pressure of the second material and pressure of the first material may be 1.4:1 (i.e. 260 bar for the second material compared with 190 bar for the first material, while running at 50 m/min)

The cable 1 also preferably comprises two strength members 107 arranged within the thickness of the sheath 101.

The two strength members 107 are arranged at diametrically opposed positions, embedded within the thickness of the inner layer 105*a* (as shown in FIG. 1) and/or the outer layer 105*b*. Preferably, each strength member 107 comprises a number of (three, in the embodiment of FIG. 1) metallic strands, e.g. coated steel strands. The strength members 107 are preferably arranged on a longitudinal plane perpendicular to the longitudinal plane containing the bisector of the cavities 105*c* and second sheath portions 106.

The cable 1 also comprises two optional ripcords 108 arranged between the optical core 100 and the inner layer 105*a*, aligned with the cavities 105*c* of the outer layer 105*b*. Each ripcord 108 is preferably made of non-metallic yarns, e.g. aramid yarns or polyester yarns. The ripcords 108 advantageously contribute to protect the core 100 from the mechanical point of view.

In order to remove a portion of few meters of the sheath 101 from the cable 1 for accessing the optical fibers 103 comprised therein, firstly the two longitudinally extending sheath portions 106 made of lower tensile strength material are identified, e.g. based on their color (which, as mentioned above, is optionally different from the color of the sheath outer layer 105*b*).

Then, a cutting tool with blades (preferably, rotating blades) is applied thereto, so that the blades penetrate through the longitudinally extending sheath portions 106 within the cavities 105*c*, the underneath portion of outer layer 105*b* (if any) and the inner layer 105*a*. This way, the blades substantially cross the sheath 101 through its entire thickness. The ripcords 108 protect the optical core 100 from damages due to accidental impacts of the blades against the buffer tube 102. The cuts divide the sheath 101 into two substantially identical halves (or half-sheaths). Then, the operator may pull the cutting tool along the cable 1, so that the blades rotate and cuts of the desired length are obtained.

A portion of optical core 100 having substantially the same length as the cuts is accordingly exposed. The operator may then remove the buffer tube 102 of the optical core 100 with a suitable cutter, thereby exposing the optical fibers 103 comprised therein. The operator may then carry out splicing and other installation operations on the optical fibers 103.

The cable 1 is therefore advantageously easier to cut, in comparison to known cables exhibiting comparable abrasion resistance and crush resistance.

The first material of which the inner and outer layers 105a, 105b of the cable's sheath 101 are made and the second material filling the outer layer's cavities 105c may be indeed chosen so that their hardness values are high enough to ensure adequate abrasion resistance and crush resistance. For instance, use of materials having hardness values in the above described ranges 55-70 and 40-60 Shore D as the first and the second material, respectively (HDPE and LDPE, for instance), ensures adequate abrasion resistance and crush resistance.

At the same time, the lower tensile strength of the second material filling the cavities 105c advantageously eases the cutting operation. Such lower tensile strength indeed allows the blades of the cutting tool to penetrate more easily at least through the outer layer 105b of the sheath 101, so that the external sheath 101 may be cut through its whole thickness by applying a reduced transversal force on the cutting tool. Also the longitudinal force to be applied in order to make the cutting tool longitudinally run along the cable and obtain cuts of the desired length is advantageously reduced.

Further, advantageously, there is no need to provide grooves on the outer surface of the sheath 101 for indicating the cut positions. Indeed, the areas where the cuts can be made in a easier way may be identified by the operator based on their color, since (as mentioned above) at such areas the color of the sheath 101 is different than in the remainder of the sheath 101.

Besides, in case of aerial installation, the cable 1 advantageously is more resistant against detrimental effects of Aeolian vibrations. Indeed, the inner layer 105a of the sheath 101 prevents the boundaries between first material and second material from entering into contact with the optical core 100 of the cable. Such arrangement of the first and second materials in the sheath 101 advantageously reduces the probability that, in case of a repeated flexing or bending of the cable due to Aeolian vibrations, the sheath 101 breaks at the boundaries between first and second materials. Moreover, even in case of break, the inner layer 105a—which is made of the first material only—remains intact and continues protecting the optical core 100, thereby preventing the cable 1 from failing.

FIG. 2 shows an optical cable 2 according to a second embodiment of the present invention. The optical cable 2 according to the second embodiment of the present invention is a drop cable for FTTH or FTTP applications.

The optical cable 2 comprises an optical core 200 and a sheath 201 surrounding the optical core 200.

The optical core 200 comprises a number of optical units 210, each optical unit 210 comprising a number of optical fibers 203. For the purposes of the present description and claims, an optical unit is intended to be an assembly comprising one or more optical fiber(s) (each optical fiber being constituted by a glass core, a glass cladding, a single or dual coating layer) and an outer layer (e.g. a retaining element or a buffer tube) surrounding said one or more optical fiber(s) in order to retain the optical fiber(s) and/or protect them from damage.

The number of optical units 210 comprised in the optical core 200 preferably ranges from 2 to 4. The number of optical fibers 203 for each unit 210 preferably ranges from 2 to 12. The fiber count of the cable 2 accordingly ranges from 4 to 48 optical fibers 203. By way of non limiting example, in the cable shown in FIG. 2 the optical core 200 comprises 4 units 210 and each unit 210 comprises 4 optical fibers 203, the fiber count being equal to 16. The optical fibers 203 are preferably single mode fibers compliant with ITU-T G652 standard. Each optical unit 210 also preferably comprises a retaining element 211 for retaining the fibers 203 of each unit 210. The interstices between the optical fiber units 210 are preferably filled with a water-blocking material 204, e.g. a thixotropic gel. Optionally, a buffer tube (not shown in the drawings) may surround all the optical fiber units 210.

The sheath 201 preferably has a structure similar to that of cable 1 shown in FIG. 1, namely: it comprises an inner layer 205a circumferentially enclosing the optical core 200, an outer layer 205b circumferentially enclosing the inner layer 205a and having at least one (two, in FIG. 2) cavities 205c, the inner and outer layers 205a, 205b being made of a first material and the cavities 205c being filled with a second material whose tensile strength is lower than the tensile strength of the first material. The geometrical features of the inner layer 205a, outer layer 205b and cavities 205c, as well as the features of the first and second materials, are the same as described above with reference to the first embodiment. Hence, a detailed description will not be repeated.

The cable 2 also preferably comprises two strength members 207 arranged within the thickness of the sheath 201, as described above first reference to the first embodiment.

The cable 3 also comprises two optional ripcords 208 between the optical core 300 and the inner layer 205a of the sheath 201, as described above with reference to the first embodiment.

Cutting of the sheath 201 from the cable 2 is similar to the cutting operation of the sheath 101 from the cable 1 shown in FIG. 1 as described above. Therefore, a detailed description will not be repeated.

Upon cutting of a length of the sheath 201 as described above, a portion of optical core 200 having substantially the same length as the cuts made in the sheath 201 is exposed. Since no buffer tube is preferably comprised in the optical core 200, the optical units 210 are directly exposed. The operator may then peel one or more units 210 by removing its retaining element 211 (either by hand or by a tool), thereby exposing the optical fibers 203 comprised therein. The operator may then carry out splicing and other installation operations on the optical fibers 203.

This second embodiment then exhibits the same advantages as the first one, namely: the sheath may be removed in a easy way and the cable is resistant against detrimental effects of Aeolian vibrations, when it is used for aerial installation.

FIG. 3 shows an optical cable 3 according to a third embodiment of the present invention. The optical cable 3 according to the third embodiment of the present invention is a central-loose tube cable for terrestrial networks.

The optical cable 3 comprises an optical core 300 and a sheath 301 surrounding the optical core 300.

The optical core 300 comprises a buffer tube 302 and a number of optical fibers 303 loosely arranged within the buffer tube 302. By way of non limiting example, in the cable shown in FIG. 3 the optical core 300 comprises 8 optical fibers 303. The buffer tube 302 is preferably made of a thermoplastic polymeric material, for instance PBT (polybutylene terephthalate). The optical fibers 303 are preferably single mode fibers compliant with ITU-T G652 standard. The interstices between the optical fibers 303 are preferably filled with a water-blocking material 304, e.g. a thixotropic gel.

The cable 3 also comprises a strength member 307 between the optical core 300 and the sheath 301. The strength member 307 preferably is a layer of glass yarns.

The sheath 301 preferably has a structure similar to that of cable 1 shown in FIG. 1, namely: it comprises an inner layer 305a circumferentially enclosing the optical core 300, an outer layer 305b circumferentially enclosing the inner layer 305a and having at least one (two, in FIG. 3) cavities 305c, the inner and outer layers 305a, 305b being made of a first material and the cavities 305c being filled with a second material whose tensile strength is lower than the tensile strength of the first material. The geometrical features of the inner layer 305a, outer layer 305b and cavities 305c, as well as the features of the first and second materials, are the same as described above with reference to the first embodiment. Hence, a detailed description will not be repeated.

The cable 3 also comprises two optional ripcords 308 underneath the cavities 305c filled with the second, lower tensile strength material. Each ripcord 308 is preferably embedded within the glass yarns 307.

Cutting of the sheath 301 from the cable 3 is similar to the cutting operation of the sheath 101 from the cable 1 shown in FIG. 1 as described above. Therefore, a detailed description will not be repeated.

Upon cutting of a length of the sheath 301, a portion of optical core 300 and glass yarns 307 having substantially the same length as the length of removed sheath are accordingly exposed. The operator may then cut the excess length of the glass yarns 307 (e.g. by means of scissors) and remove the buffer tube 302 with a suitable cutter, thereby exposing the optical fibers 303 comprised therein. The operator may then carry out splicing and other installation operations on the optical fibers 303.

This third embodiment then exhibits the same advantages as the first one, namely: the sheath may be removed in a easy way and the cable is resistant against detrimental effects of Aeolian vibrations, when it is used for aerial installation.

Furthermore, although in all the above described embodiments the cavities in the sheath outer layer, which are filled with the second, lower tensile strength material, are arranged at diametrically opposed positions, this is not limiting. According to variants not shown in the drawings, the cavities filled with the second, lower tensile strength material are arranged at not diametrically opposed positions, namely they are spaced apart by an angle different from 180°.

According to other variants not shown in the drawings, outer layer of the cable sheath has a single cavity filled with the second, lower tensile strength material. In such cases, a single cut is made in the cable sheath, by using a cutting tool comprising a single blade. The advantages set for above are preserved.

Although in the above description reference have been made only to loose-tube cables, it an be appreciated that the sheath structures described above may be applied to optical cables with other types of optical cores (ribbon, tight-buffered, etc.).

The invention claimed is:

1. An optical cable comprising an optical core and an external sheath surrounding the optical core, wherein the external sheath comprises:
    an inner layer circumferentially enclosing the optical core; and
    an outer layer circumferentially enclosing the inner layer and comprising at least one cavity accessible from outside the external sheath and extending through at least a portion of the thickness of the outer layer,
    wherein the inner layer and the outer layer are made of a first material having a first tensile strength and the at least one cavity of the outer layer is filled with a second material having a second tensile strength lower than the first tensile strength.

2. The optical cable according to claim 1, wherein the at least one cavity has an oval cross-section.

3. The optical cable according to claim 2, wherein the outer layer comprises two cavities arranged at diametrically opposed positions with respect to the optical core.

4. The optical cable according to claim 1, wherein the at least one cavity has a depth between 30% to 60% of an overall thickness of the external sheath.

5. The optical cable according to claim 1, wherein the at least one cavity is accessible from outside the external sheath along an arc of a curved line delimiting a cross section of the at least one cavity, the arc having an angular width comprised between 20 and 60 degrees.

6. The optical cable according to claim 1, wherein the first material has a tensile strength comprised between 10 and 25 MPa and the second material has a tensile strength comprised between 25 and 35 MPa.

7. The optical cable according to claim 1, wherein the first material has a first flexural modulus and the second material has a second flexural modulus lower than the first flexural modulus.

8. The optical cable according to claim 7, wherein the first flexural modulus is comprised between 600 and 1200 MPa and the second flexural modulus is comprised between 200 and 600 MPa.

9. The optical cable according to claim 1, wherein the first material has a first hardness and the second material has a second hardness lower than the first hardness.

10. The optical cable according to claim 9, wherein the first hardness is comprised between 55 and 70 Shore D and the second hardness is comprised between 40 and 60 Shore D.

11. The optical cable according to claim 1, wherein the first material and the second material comprise the same compound.

12. The optical cable according to claim 1, wherein the at least one cavity of the outer layer is filled with the second material blended with the first material.

13. The optical cable according to claim 1, wherein the first material is high-density polyethylene.

14. The optical cable according to claim 1, wherein the second material is low-density polyethylene.

15. A process for manufacturing an optical cable, the process comprising:
    providing an optical core; and
    extruding an external sheath surrounding the optical core, the external sheath comprising:
        an inner layer circumferentially enclosing the optical core; and
        an outer layer circumferentially enclosing the inner layer and comprising at least one cavity accessible from outside the external sheath and extending through a portion of the thickness of the outer layer, wherein the inner layer and the outer layer are made of a first material having a first tensile strength and the at least one cavity of the outer layer is filled with a second material having a second tensile strength lower than the first tensile strength.

* * * * *